(12) United States Patent
Ledingham et al.

(10) Patent No.: US 6,669,009 B2
(45) Date of Patent: Dec. 30, 2003

(54) GUIDE RAIL SUPPORT BRACKET ASSEMBLY FOR CONVEYOR SYSTEM

(75) Inventors: Stuart J. Ledingham, Coto de Caza, CA (US); David N. Padgett, Carlsbad, CA (US)

(73) Assignee: Valu Engineering, Inc., Rancho Santa Margarita, CA (US)

( * ) Notice: Subject to any disclaimer, the term of this patent is extended or adjusted under 35 U.S.C. 154(b) by 0 days.

(21) Appl. No.: 09/949,154

(22) Filed: Sep. 7, 2001

(65) Prior Publication Data

US 2002/0121428 A1 Sep. 5, 2002

Related U.S. Application Data

(63) Continuation-in-part of application No. 09/790,209, filed on Feb. 20, 2001.

(51) Int. Cl.⁷ .............................................. B65G 21/20
(52) U.S. Cl. ............................... 198/836.3; 248/230.1; 248/295.1
(58) Field of Search ................... 198/836.3; 248/230.1, 248/231.85, 295.11, 300

(56) References Cited

U.S. PATENT DOCUMENTS

| | | |
|---|---|---|
| 4,225,035 A | 9/1980 | Mohney et al. |
| 4,502,594 A | 3/1985 | Sijbrandij |
| 5,335,782 A | 8/1994 | Herzog |
| 5,626,221 A | 5/1997 | Ledingham |
| 5,692,596 A | 12/1997 | Ledingham |
| 5,860,511 A | 1/1999 | Ensch et al. |
| 6,189,685 B1 * | 2/2001 | Ledingham et al. ..... 198/836.3 |
| 6,454,084 B2 * | 9/2002 | Csiki et al. .............. 198/836.3 |
| 6,543,608 B2 * | 4/2003 | Ledingham et al. ..... 198/836.3 |

OTHER PUBLICATIONS

Pages 69–72 of Nolu Plastics Valu Guide Copyright 2000 Solus Industrial Innovation, LLC.
Page 74 of Nolu Plastics Valu Guide Copyright 2000 Solus Industrial Innovation, LLC.
Page 82 of Nolu Plastics Valu Guide Copyright 2000 Solus Industrial Innovation, LLC.

* cited by examiner

Primary Examiner—Joseph E. Valenza
(74) Attorney, Agent, or Firm—Knobbe, Martens, Olson & Bear, LLP

(57) ABSTRACT

A guide rail support bracket assembly for supporting a conveyor system guide rail through a support rod. The assembly includes a support bracket having a mounting segment configured for mounting to a conveyor body. In one aspect, the support bracket is formed by cutting and bending a generally flat metal plate. A support segment is connected to the mounting segment and, spaced from the mounting segment, to an angled clamping section. The support rod is clamped into the clamping section by an eyebolt that fits through a clamping hole formed in the angled clamping section. The eyebolt is drawn into the angled clamping section by a clamping knob. In certain aspects, an extension segment is interposed between the mounting and the support segments to space the support segment further from a conveyor body. In other aspects, the support bracket and clamping sections are separate pieces pivotably joined by a fastener.

16 Claims, 14 Drawing Sheets

GUIDE RAIL SUPPORT BRACKET ASSEMBLY FOR CONVEYOR SYSTEM

RELATED APPLICATIONS

This is a continuation-in-part of pending U.S. application Ser. No. 09/790,209 filed Feb. 20, 2001 titled "Guide Rail Support Bracket for Conveyor System".

BACKGROUND OF THE INVENTION

1. Field of the Invention

This invention relates generally to assembly line and conveyor systems that provide the guided transport of objects along a predetermined path and, more particularly, the invention relates to a support bracket that secures guide rails in place on a conveyor system.

2. Description of the Related Art

Manufacturers commonly utilize conveyor systems in processing, packaging, and assembly lines in which a product travels on a conveyor chain and is transported through or between various manufacturing procedures. Guide rails are typically provided to maintain specific positioning of the product during a procedure. The guide rails also inhibit lateral movement during transport that may result in the product falling off the chain and jamming the conveyor system leading to delays in the production process. The product can also become damaged if it comes off the conveyor chain.

Guide rail support assemblies are typically utilized on each side of the conveyor chain structure to align one or more guide rails along the predetermined path. Usually, pairs of assemblies are located across from each other along the conveyor system. Typically, guide rail support brackets are attached to the sides of the conveyor structure, and support rods are mounted to the brackets. It is desirable to maintain the guide rails in a tangential orientation with respect to the conveyor travel to minimize side-loading and vibration between the guide rails and the objects.

One difficulty is that, in many applications, the products are of different sizes. For example, a bottling plant may spend part of one day processing small bottles and the remainder of the day processing bottles of much larger diameter. However, in portions of production lines the guide rails need to maintain close contact with all sizes of objects. In certain situations, new products or new container sizes can be of sufficient size as to create an interference with the guide rail support brackets as shown in FIG. 7.

Accordingly, the typical practice in the art is to remove the brackets and reattach them with longer bolts and with one or more spacers interposed between the brackets and the sides of the conveyor structure as shown in FIG. 8. Thus, the brackets are moved outwardly enough to clear the larger product on the conveyor chain.

For most conveyor guide rail applications, the guide rails are arranged parallel to the conveyor body and, thus, the conveyor chain. However, in applications including in-line transfers from one conveyor line to another adjacent parallel but laterally displaced conveyor line or in conveyors including curves, the surface of the conveyor body and the guide rails are not parallel in the transition/curve region. It is known to provide plastic swivel bodies on a fixed guide rail support to allow the guide rail to pivot with respect to the guide rail support bracket and the conveyor body. However, these swivel bodies are typically configured with internal cavities and gaps. These cavities and gaps can retain debris present in the conveyor environment making it difficult to clean the cavities and gaps.

In addition, the plastic swivel bodies depend on a plastic-to-plastic mating surface. As is well known in the art, plastic can only endure a limited amount of tightening torque without damaging the material. Also, the plastic tends to cold flow and is inherently a low friction material. Thus, the plastic swivel bodies tend to loosen over time especially in the high vibration environment of a conveyor system. Plastic is also susceptible to damage from certain harsh cleaning solutions used in conveyor systems.

From the foregoing, it will be appreciated that there is a need for a guide rail support bracket assembly that obviates the need for spacers when larger products are to be used on a conveyor system. There is also a need for a guide rail support bracket that can support a guide rail in various orientations with respect to the conveyor body, yet be made of materials resistant to the conveyor environment and provide minimal cavities for retention of material.

SUMMARY OF THE INVENTION

The aforementioned needs are satisfied by the invention, which in one aspect, provides a guide rail support bracket assembly for supporting a conveyor system guide rail through a support rod. The assembly includes a support bracket having a mounting segment configured to be mounted to a conveyor body. The support bracket is preferably formed by cutting and bending a generally flat metal plate. An extension segment is attached along a first edge to the mounting segment. A support segment is connected along an edge to a second edge of the extension segment and, at another end, spaced from the mounting segment, to an angled clamping section. The support rod is clamped into the clamping section by an eyebolt that fits through a clamping hole formed in the angled clamping section. The eyebolt is drawn into the angled clamping section by a clamping knob or fastener.

The guide rail support bracket assembly of this invention overcomes the limitations of the prior art in a number of ways. First, the support bracket is preferably constructed of stainless steel, which is not susceptible to deterioration from harsh cleaning chemicals. Second, the support bracket assembly has less internal or hard to access surface area in comparison to the prior art, which makes the bracket easy to clean and prevents the trapping of cleaning chemicals. Third, the support bracket does not have a cylindrical cavity that limits the maximum diameter of the support rod that would otherwise have to fit through the cavity. Fourth, the support bracket assembly can accommodate support rods of variable sizes by using an eyebolt with an appropriately sized eyelet. Furthermore, the support bracket has a simple construction that makes the bracket easy and inexpensive to fabricate.

In one aspect of the invention, a guide rail support bracket assembly for a conveyor system comprises: (1) a support bracket comprising: (a) a mounting segment extending substantially along a first plane; an extension segment attached along a first edge to the mounting segment; and a support segment connected along an edge to a second edge of the extension segment and along another edge to the mounting segment, the extension and support segments extending substantially along a second plane substantially perpendicular to the first plane; and (b) an angled clamping section having a clamping hole formed therein, the angled clamping section being connected to the support segment at an end spaced from the mounting segment; (2) a threaded eyebolt ending in an eyelet, the eyebolt configured to fit through the clamping hole such that the eyelet is positioned on a concave side of the angled clamping section; and (3) a fastener configured to thread onto the eyebolt and pull the eyelet into the angled clamping section from an opposite side of the angled clamping section. In one aspect of the invention, the bracket is formed by cutting and bending a single generally flat metal plate. In another aspect, the mounting segment, the extension segment, and the support segment together define a support bracket formed by cutting and bending a generally flat metal plate and wherein the angled clamping section is formed by cutting and bending a separate generally flat metal plate and wherein the support bracket and angled clamping sections each further comprise a pivot segment and wherein the support bracket and angled clamping sections are attachable in a 360° rotational orientation In a particular aspect of the invention, the angled clamping section is configured to secure a guide rail support rod, the angled clamping section comprising: (a) a first clamping segment attached to the support segment beyond the mounting segment, the first clamping segment extending substantially along a third plane, the third plane being substantially perpendicular to the first plane, the first clamping segment being oriented at about a 45° angle relative to the support segment; and (b) a second clamping segment connected to the first clamping segment at a clamping joint, the second clamping segment extending along a fourth plane, the fourth plane being substantially perpendicular to the first plane, the second clamping segment being oriented between about 70° and 110° relative to the first clamping segment. In a preferred aspect of the invention, the angled clamping section has a clamping hole formed therethrough.

In still another aspect of the invention, a conveyor system guide rail support bracket assembly comprises: (1) a conveyor having a conveyor body; (2) a first guide rail support bracket formed by cutting and bending a flat metal plate, the bracket comprising: (a) a mounting segment attachable to the conveyor body so as to define a proximate configuration; (b) a support segment connected at one end to the mounting segment; and (c) an angled clamping section connected to the support segment at an end spaced from the mounting segment; (3) at least a second guide rail support bracket formed by cutting and bending a flat metal plate, the bracket comprising: (a) a mounting segment attachable to the conveyor body so as to define at least a first distal configuration; (b) an extension segment attached along a first edge to the mounting segment; (c) a support segment connected along an edge to a second edge of the extension segment; and (d) an angled clamping section connected to the support segment at an end spaced from the mounting segment; (4) a clamping mechanism; (5) a support rod clamped into the angled clamping section by the clamping mechanism; and (6) a guide rail attached to an end of the support rod.

In one particular aspect, the clamping mechanism comprises a clamping hole formed in the angled clamping section, a threaded eyebolt ending in an eyelet, the eyebolt configured to fit through the clamping hole such that the eyelet is positioned on a concave side of the angled clamping section, and a fastener configured to thread onto the eyebolt and pull the eyelet into the angled clamping section from an opposite side of the angled clamping section.

In yet another aspect, the invention is a guide rail support bracket assembly for a conveyor system, the assembly comprising a support bracket comprising (1) a mounting segment and a support segment connected to the mounting segment; and (2) a bracket pivot segment attached to the support segment, an angled clamping section having a clamping hole formed therein, the angled clamping section also defining a clamping section pivot segment wherein the angled clamping section is connected to the support bracket via the pivot segments such that the support bracket and the angled clamping section can be secured in any of a 360° relative orientations, a threaded eyebolt ending in an eyelet, the eyebolt configured to fit through the clamping hole such that the eyelet is positioned on a concave side of the angled clamping section, and a fastener configured to thread onto the eyebolt and pull the eyelet into the angled clamping section from an opposite side of the angled clamping section. In one particular aspect, the support bracket further comprises an extension segment attached along a first edge to the mounting segment and along a second edge to the support segment.

An additional aspect of the invention is a method of guiding objects on a conveyor system, the conveyor system comprising a conveyor body and the conveyor system transporting objects along a non-strictly linear path, the method comprising attaching a guide rail support bracket to the conveyor body, attaching a guide rail to a clamping section, and interconnecting the guide rail support bracket and the clamping section such that the guide rail is positioned in a substantially tangential orientation with respect to the conveyor travel. These and other objects and advantages will become more fully apparent from the following description taken in conjunction with the accompanying drawings.

DETAILED DESCRIPTION OF THE PREFERRED EMBODIMENT

In the following description, reference is made to the accompanying drawings, which form a part hereof, and which show, by way of illustration, specific embodiments in which the invention may be practiced. Other embodiments may be utilized and structural changes may be made without departing from the scope of the present invention. Numerous specific details are set forth in order to provide a thorough understanding of the present invention. However, it will be understood by one skilled in the art that the present invention may be practiced without the specific details or with certain alternative equivalent devices and methods to those described herein.

Figure 1A:
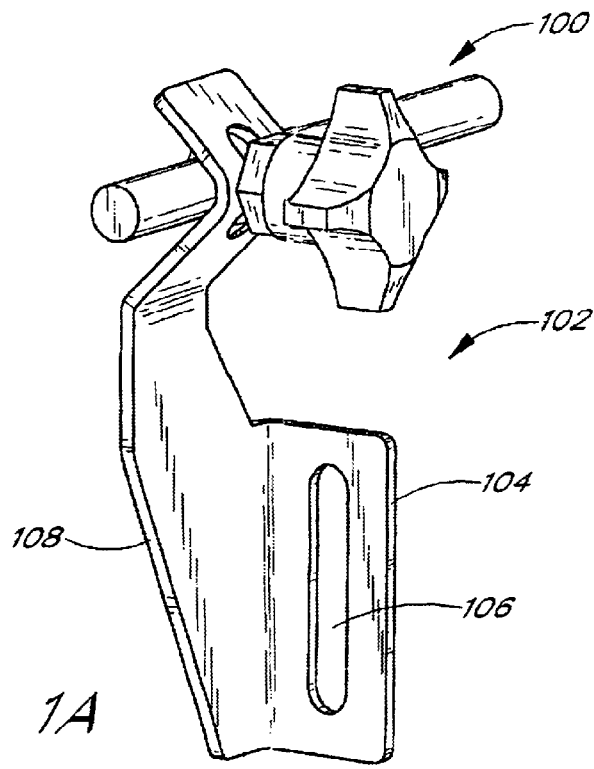
FIG. 1A illustrates a perspective view of one embodiment of a guide rail support bracket assembly including a support bracket.
Figure 1B:
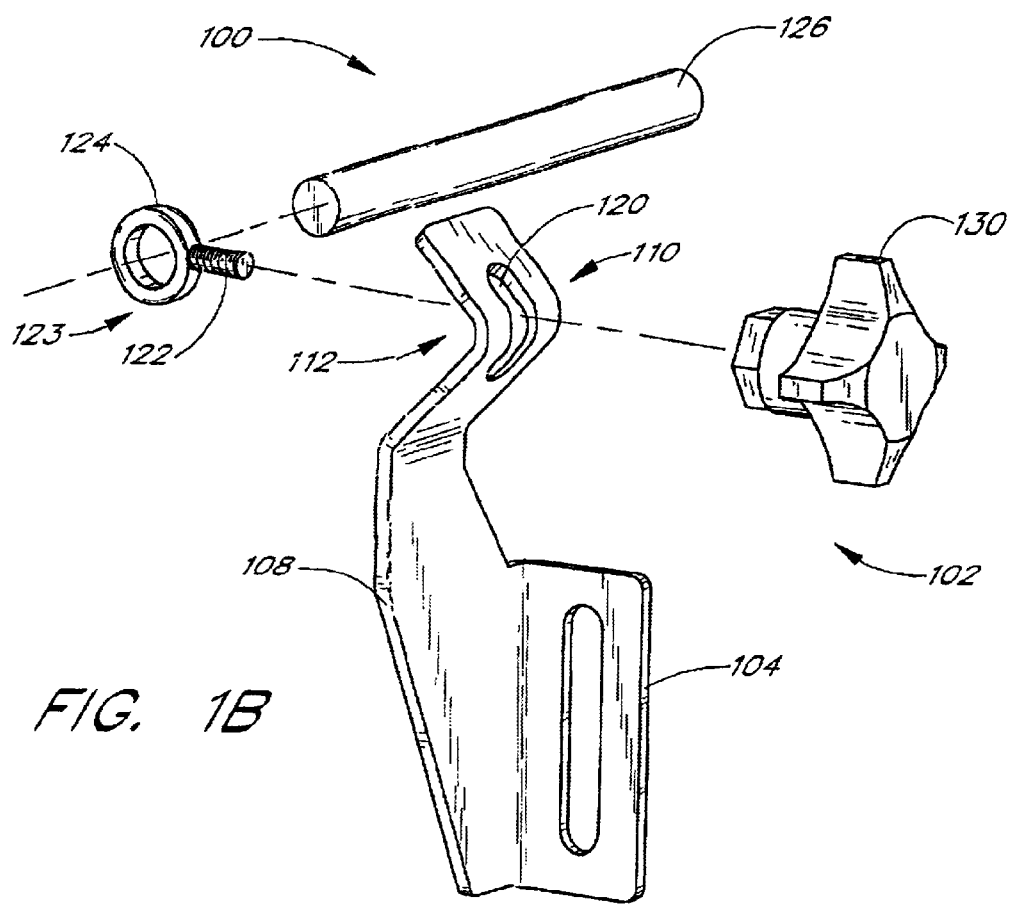
FIG. 1B illustrates an exploded perspective view of the assembly of FIG. 1A.

Referring to FIGS. 1A and 1B, one embodiment of a guide rail support bracket assembly 100 includes a guide rail support bracket 102, which, in its preferred form, is constructed from a one-piece member stamped or bent from a flat plate of stainless steel, carbon steel, or any suitable metal or alloy. A mounting segment 104 preferably extends in a vertical plane and has an elongated mounting hole 106 for mounting and adjusting the bracket 102. A vertically aligned support segment 108 is attached substantially along the edge of the mounting segment 104 such that the support segment 108 is substantially perpendicular to the mounting segment 104. The support segment 108 extends above the mounting segment 104 to form an angled clamping section 110. The clamping section 110 defines a concave recess 112 having a shallow "V" shape.

A guide rail support rod 126 is clamped into the clamping section 110 by a clamping mechanism. In the preferred embodiment, the clamping mechanism comprises an eyebolt 123, a threaded clamping knob (fastener) 130, and a clamping hole 120. The support rod 126 is inserted through an eyelet 124 positioned on the end of a threaded portion 122 of the eyebolt 123. The clamping hole 120 is formed in the clamping section 110 to allow the threaded portion 122 and the eyelet 124 of the eyebolt 123 to fit through the clamping section 110. The eyebolt 123 and eyelet 124 are drawn into the clamping section 110 by the threaded clamping knob 130 from a side of the clamping section 110 opposite the concave recess 112. After the support rod 126 is inserted through the eyelet 124 and the eyebolt 123 inserted through the clamping hole 120, the knob 130 is turned to draw the support rod 126 into the clamping section 110. As the clamping knob 130 is tightened, the support rod 126 becomes firmly clamped within the concave recess 112 of the clamping section 110.

In the preferred embodiments, the clamping hole 120 is elongated, has a height slightly greater than the outer diameter of the eyelet 124, and has a width slightly greater than the width of the threaded portion 122 or the eyelet 124, whichever is greater. The diameter of the eyelet 124 is preferably slightly larger than the diameter of the support rod 126. In addition, the height of the clamping hole 120 can be made large enough to accommodate eyelets 124 of varied diameters. Accordingly, support rods 126 having larger diameters can be used with the support bracket 102 by selecting an eyebolt 123 having an eyelet 124 with a large enough diameter to accommodate the support rod 126. Some eyebolts 123 with larger diameter eyelets 124 may also be able to be used with support rods 126 having smaller diameters.

In an alternative embodiment, the clamping mechanism can comprise a "U" bolt, two clamping knobs, and one or two clamping holes formed on opposite sides of the clamping section 110. The support rod 126 can be inserted into the "U" bolt, the "U" bolt can be inserted into the clamping holes, and the clamping knobs can be tightened to draw the support rod 126 into the clamping section 110. Other clamping mechanisms could also be used as will be recognized by one skilled in the art.

Figure 2A:
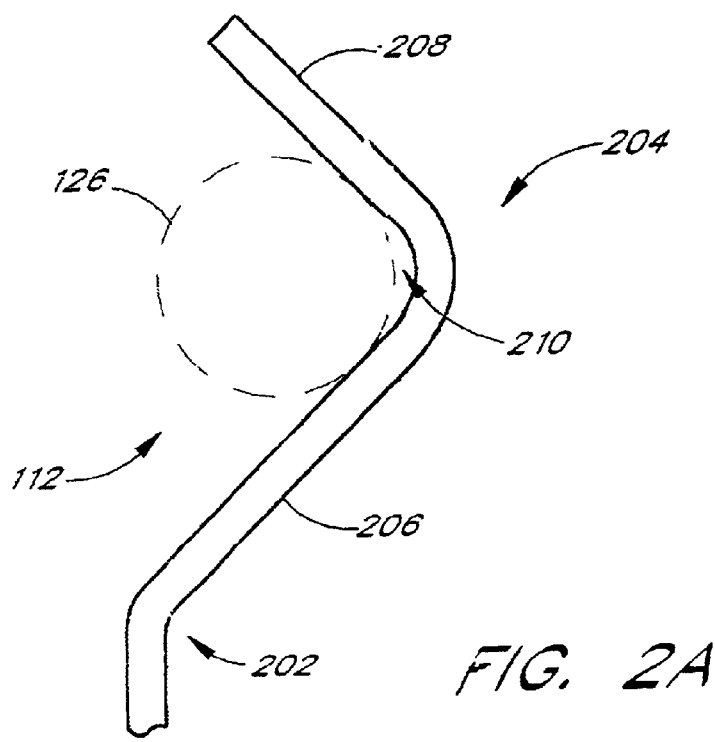
FIG. 2A illustrates a front elevational view of the clamping section of the support bracket of FIG. 1.

FIG. 2A illustrates a front elevational view of the clamping section 110 in accordance with one embodiment of the invention. The clamping section 110 of this embodiment is preferably formed from a lower bend 202 of approximately 45 degrees from the support segment 108 in a first direction and an upper bend 204 of approximately 90 degrees in an opposite direction. The lower bend 202 and upper bend 204 define a lower clamping segment 206, an upper clamping segment 208, and the concave recess 112 of the clamping section 110. In the illustrated embodiment, the radius of the upper bend 204 is somewhat smaller than the radius of the support rod 126. A gap 209 is therefore left between the support rod 126 and the upper bend 204. In an alternative embodiment, the radius of the upper bend 204 can be configured to be substantially similar to the radius of the support rod 126, in which case there will be little or no gap 210.

Figure 2B:
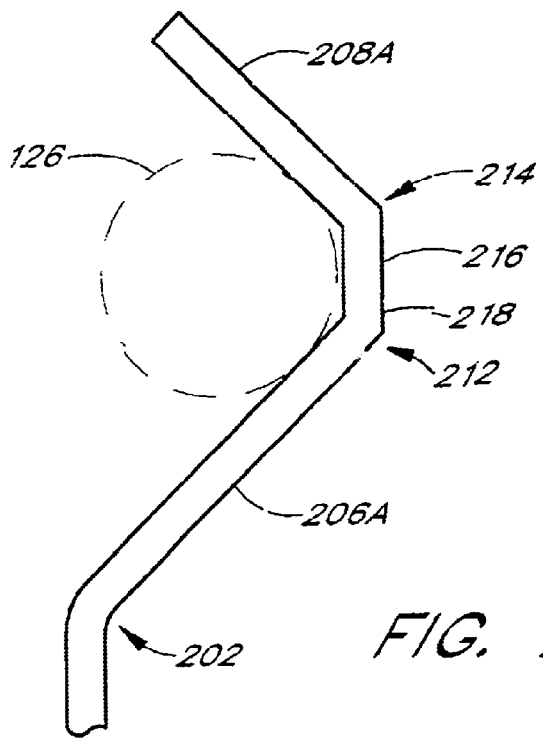
FIG. 2B illustrates a front elevational view of an alternative embodiment of the clamping section.

FIG. 2B illustrates a front elevational view of the clamping section 110 in accordance with an additional embodiment of the invention. In this embodiment, the upper bend 204 is replaced by a first upper bend 212 of about 45 degrees and a second upper bend 214 of about another 45 degrees. The first upper bend 212 and the second upper bend 214 define a straight connecting segment 216 that connects a lower clamping segment 206A to an upper clamping segment 208A. The lower clamping segment 206A and the upper clamping segment 208A are preferably oriented at approximately a 90 degree angle relative to each other. The connecting segment 216 preferably has a flat surface 218 on the exterior surface of the clamping section 110 upon which the clamping knob 130 can squarely rest.

Figure 3:
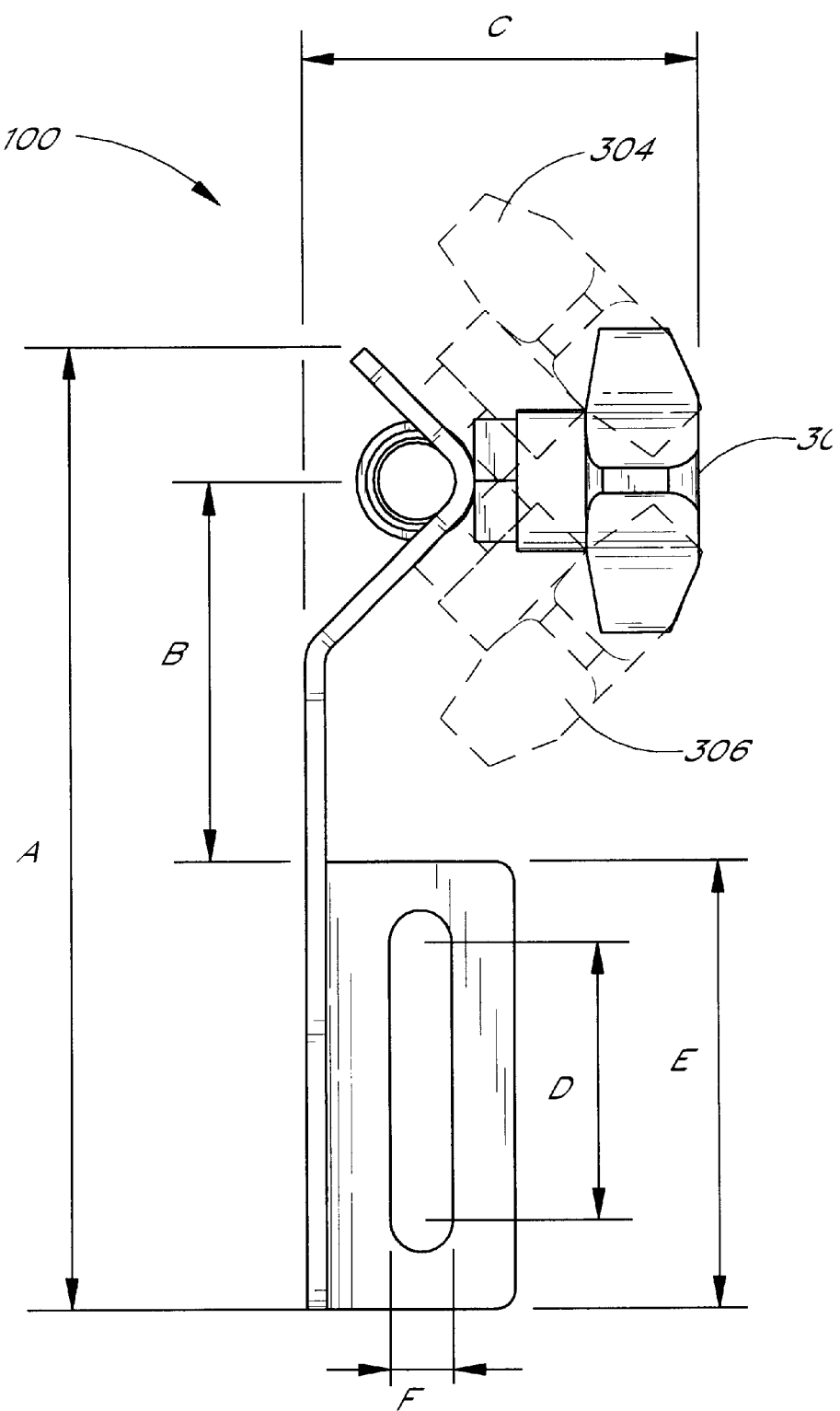
FIG. 3 illustrates a front elevational view of the assembly of FIG. 1 showing three possible positions of the clamping knob.

Referring to FIG. 3, the clamping knob 130 and eyebolt 123 can be placed in three different positions relative to the clamping section 110. In a first position 302, shown in solid line, the eyebolt 123 extends and the knob 130 rotates substantially along a horizontal axis. In a second position 304, shown in phantom, the knob 130 rotates substantially along an axis elevated at 45 degrees. In a third position 306, also shown in phantom, the knob 130 rotates substantially along an axis declined by 45 degrees. The knob 130 and eyebolt 123 can also be positioned at any location between the three positions 302, 304, and 306 if the clamping section 110 is configured in accordance with FIG. 2A and wherein the radius of the upper bend 204 is substantially similar to the radius of the support rod 126. The clamping knob 130 and eyebolt 123 can therefore be placed in various positions to accommodate the preference of the individual installing or adjusting the assembly 100. In addition, the configuration of any surrounding equipment may make some clamping positions preferable over others.

Figure 4:
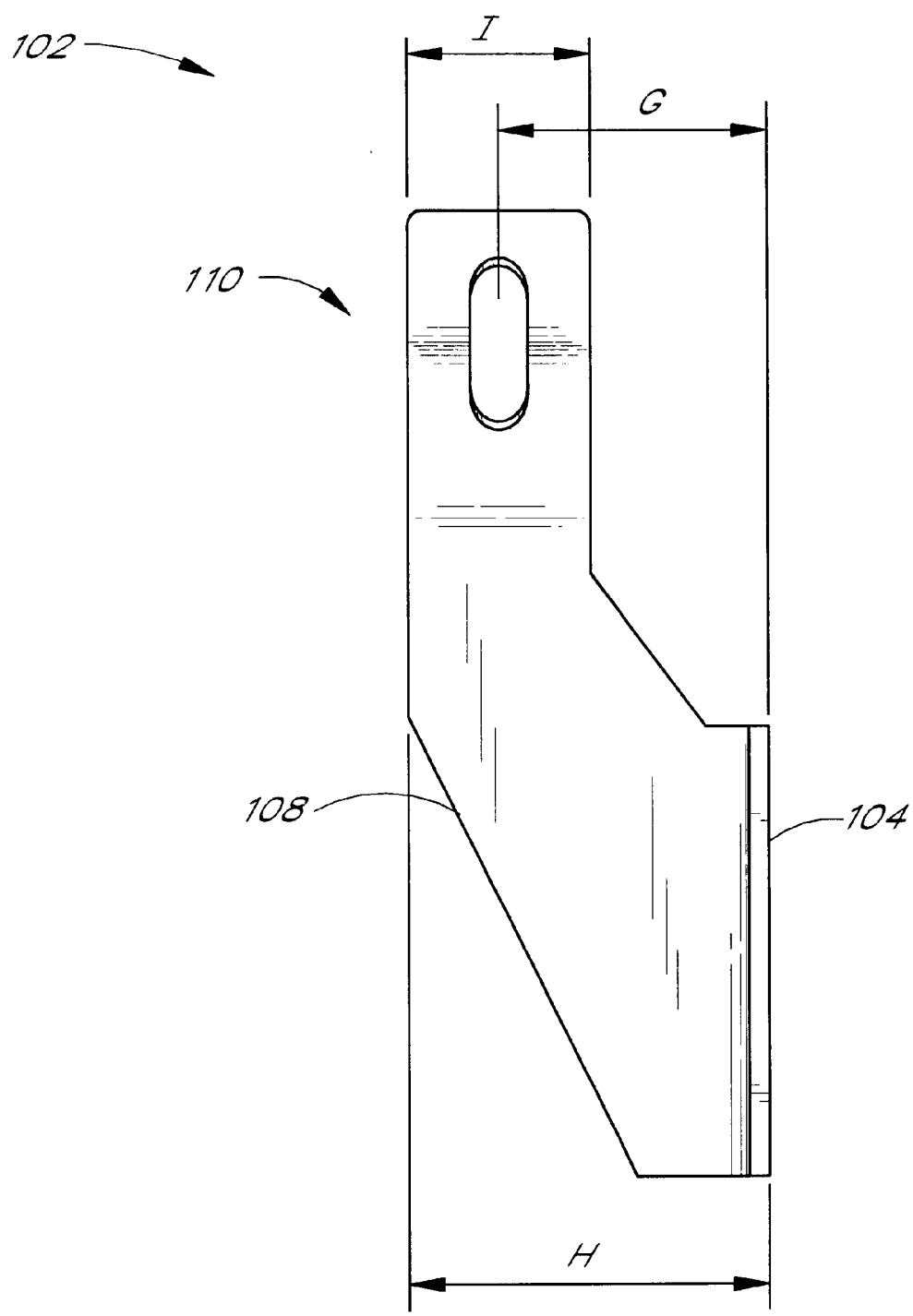
FIG. 4 illustrates a side elevational view of the assembly of FIG. 1.

FIGS. 3 and 4 indicate, through the corresponding letters listed below, the dimensions of one embodiment of the assembly 100. The dimensions are approximately as follows:

A—6.33 inches
B—2.52 inches
C—2.60 inches
D—1.84 inches
E—2.94 inches
F—0.41 inches
G—1.77 inches
H—2.36 inches
I—1.20 inches Although the dimensions of this embodiment are listed above, it will be noted that the dimensions of alternate embodiments can be adjusted accordingly to take into account the specific requirements of alternate applications.

The support bracket 102 is preferably formed from a single steel plate. The steel plate is first cut into a requisite shape and then appropriately bent to form the support bracket 102. Alternatively, each segment of the support bracket can be individually cut from steel plating and the support bracket can be formed by joining, preferably by welding, the individual segments together. The support bracket 102 is preferably formed from 11 gauge or 0.120 inch thick stainless steel.

Figure 5:
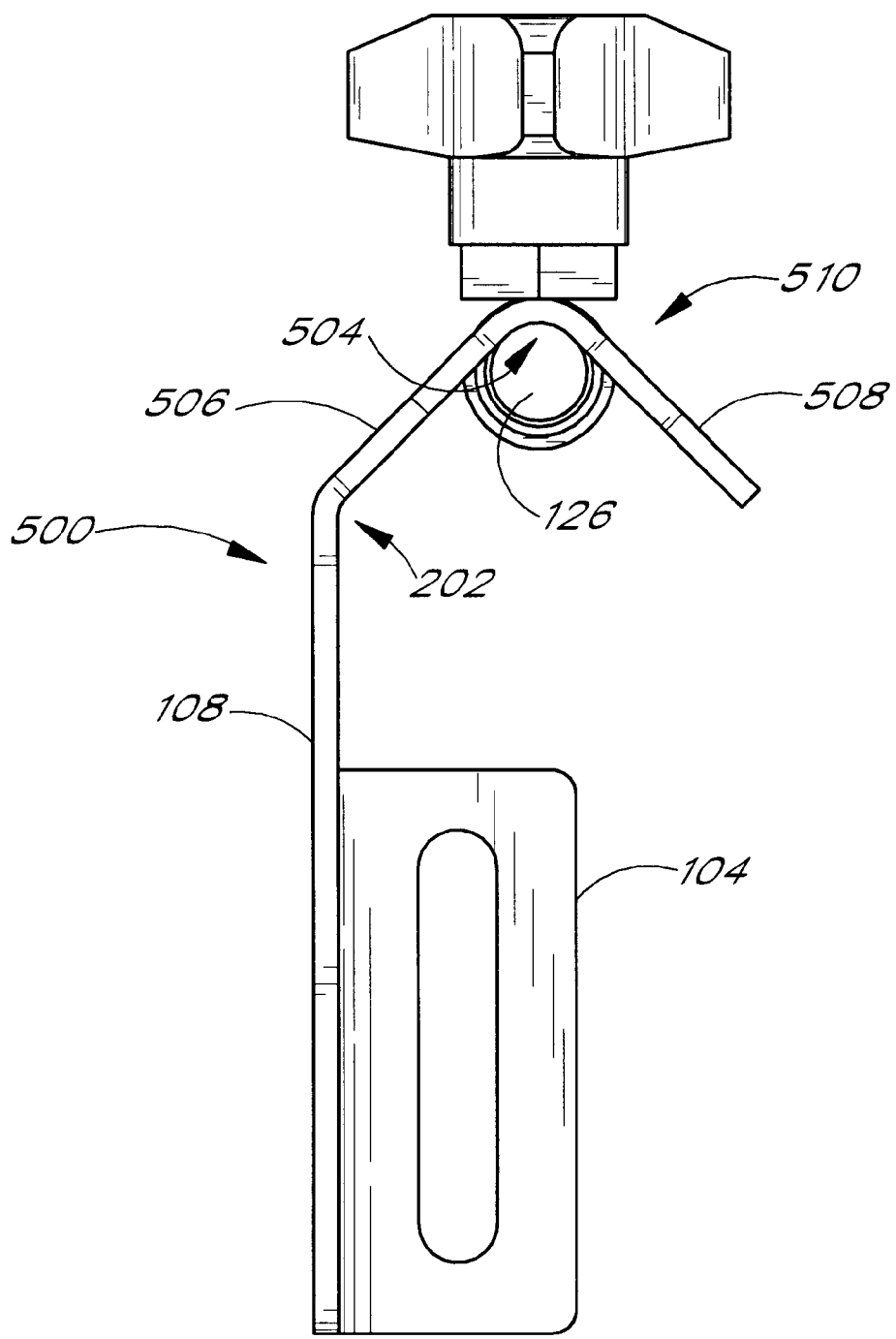
FIG. 5 illustrates a front elevational view of an alternative embodiment of the guide rail support bracket assembly.

FIG. 5 illustrates a front elevational view of an alternative embodiment of a guide rail support bracket assembly 500. In this embodiment, a clamping section 510 is oriented to clamp the support rod 126 from above rather than from the side. The mounting segment 104, the support segment 108, and the lower bend 202 are similar to or the same as those of the embodiment illustrated in FIGS. 1–4. An upper bend 504 of approximately 90 degrees, however, bends in the same direction as the lower bend 202. The lower bend 202 and upper bend 504 define a first clamping segment 506 and a second clamping segment 508.

Figure 6:
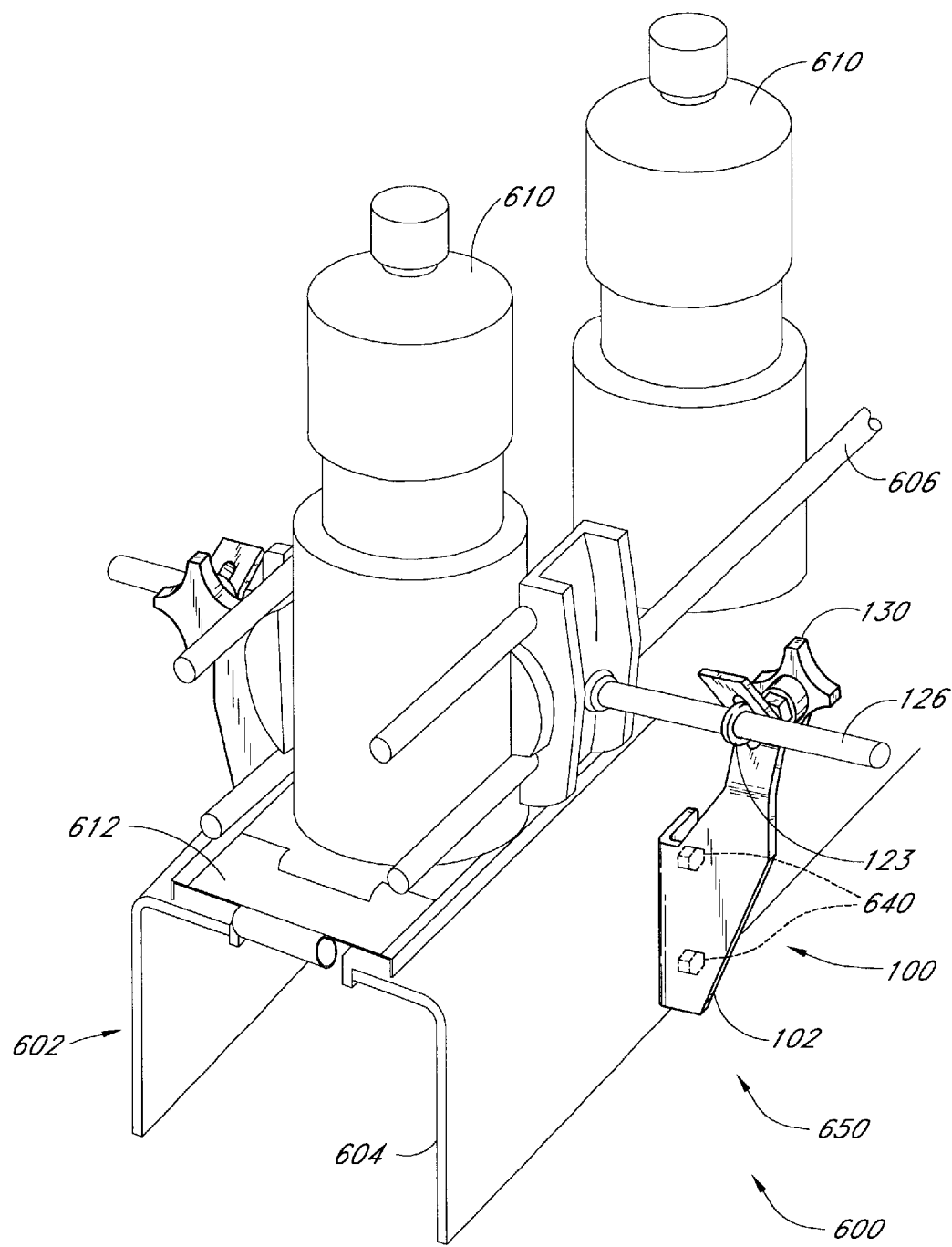
FIG. 6 illustrates the guide rail support bracket assembly of FIG. 1 in conjunction with a guide rail and a conveyor system, the assembly being installed in a proximal configuration.
Figure 7:
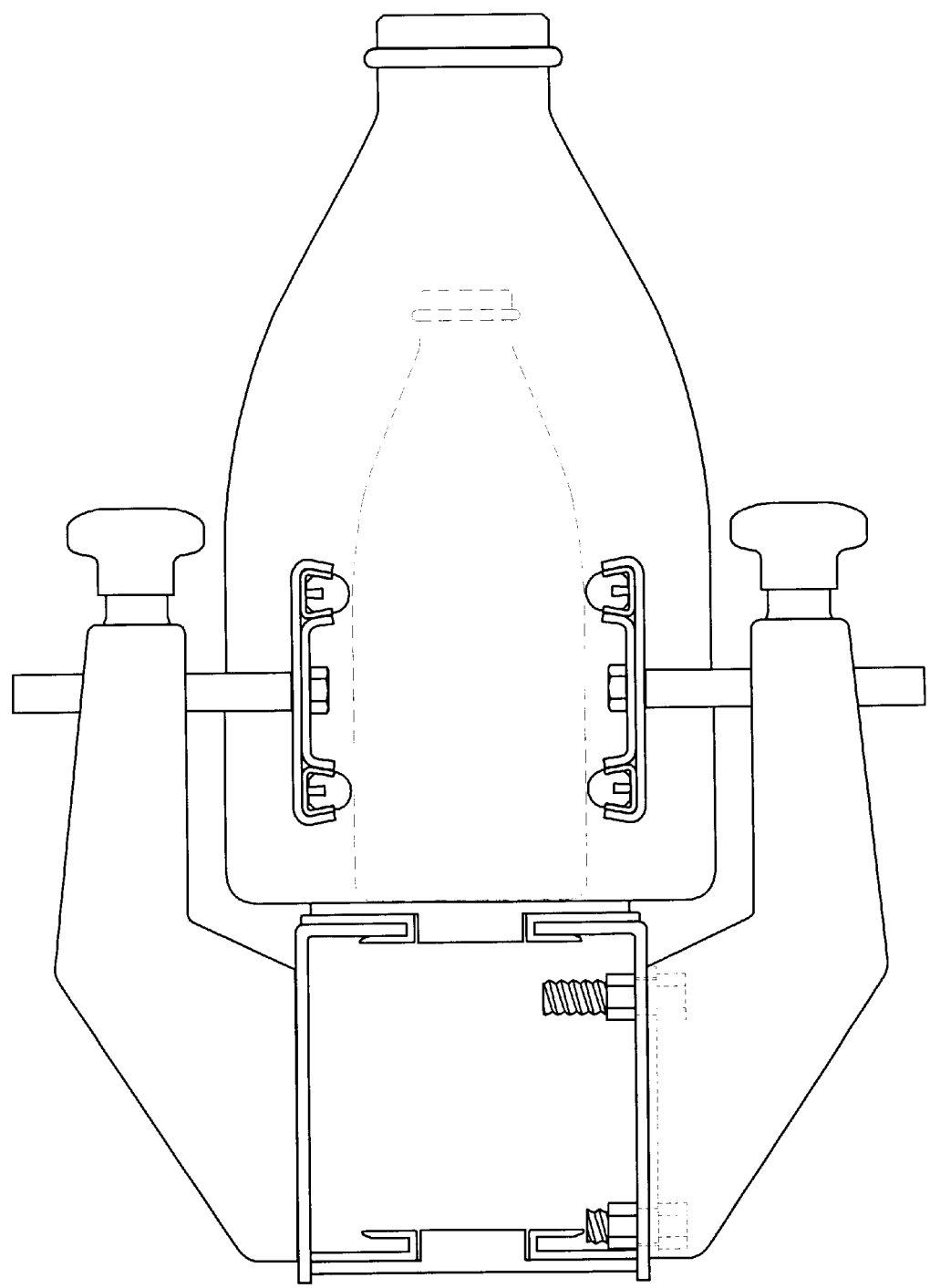
FIG. 7 is an in-line section view of a prior art conveyor system carrying objects of different sizes showing interference between the larger object and guide rails.
Figure 8:
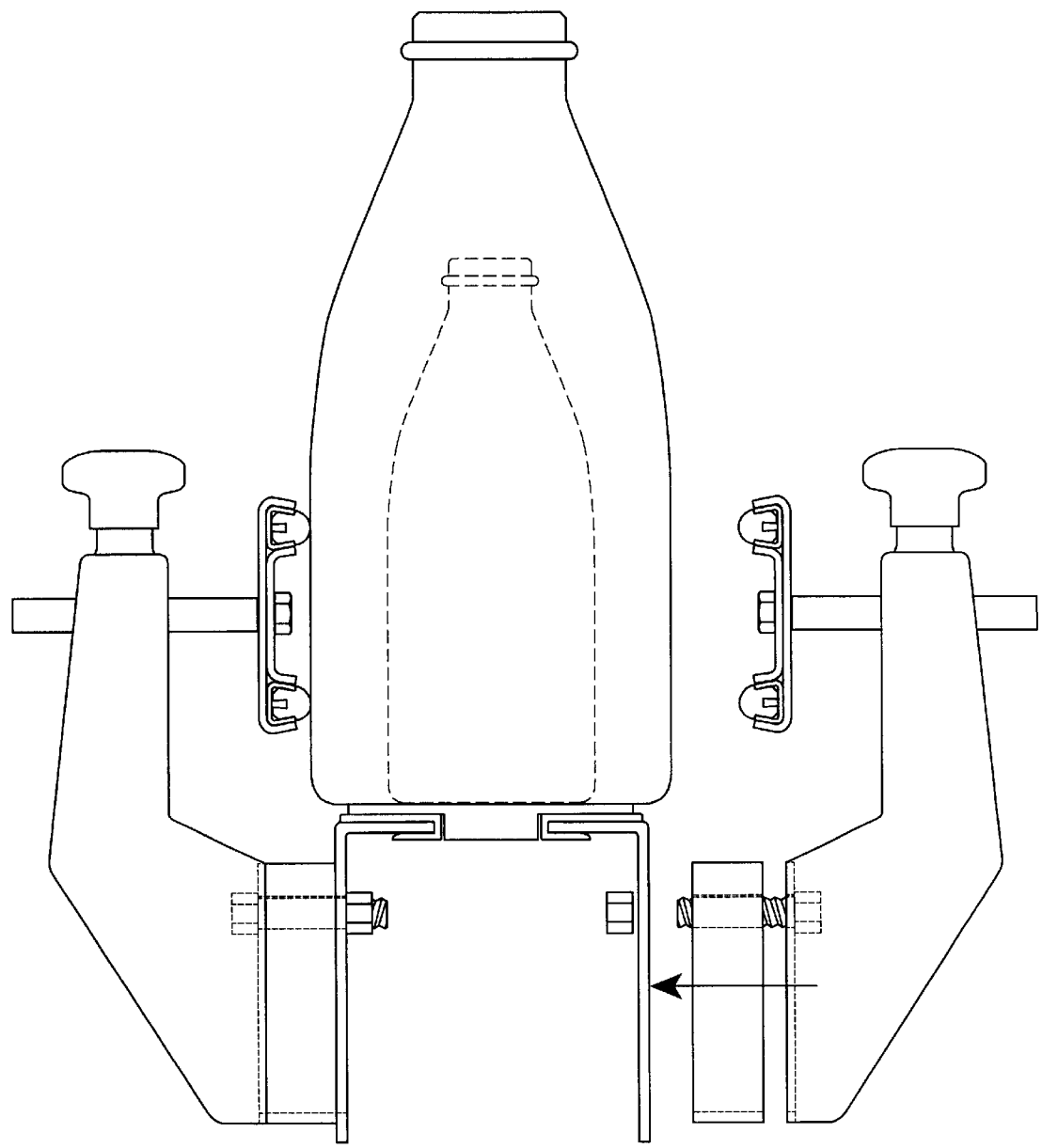
FIG. 8 is an in-line section view of a typical alternative installation of the conveyor system of FIG. 7 including spacers and the longer attachment bolts to avoid the interference shown in FIG. 7.

FIG. 6 illustrates the guide rail support bracket assembly 100 in conjunction with a conveyor system 600 in a proximate configuration 650 in which the guide rail support bracket assembly 100 can support the support rods 126 to accommodate small objects 610. A conveyor 602 has a conveyor body 604 to which the support bracket 102 is directly mounted. The support bracket 102 can be mounted by one or more fasteners 640 through the elongated mounting hole 106 directly adjacent the conveyor body 604. The elongated mounting hole 106 preferably allows the support bracket 102 to be vertically adjusted on the conveyor body 604. The support rod 126 is clamped into the clamping section 110 of the support bracket 102 by the eyebolt 123 and the clamping knob 130. A guide rail 606 is attached to the end of the support rod 126 and supported by the support rod 126. The guide rail 606 guides the small objects 610 along the conveyor belt 612.

Figure 9:
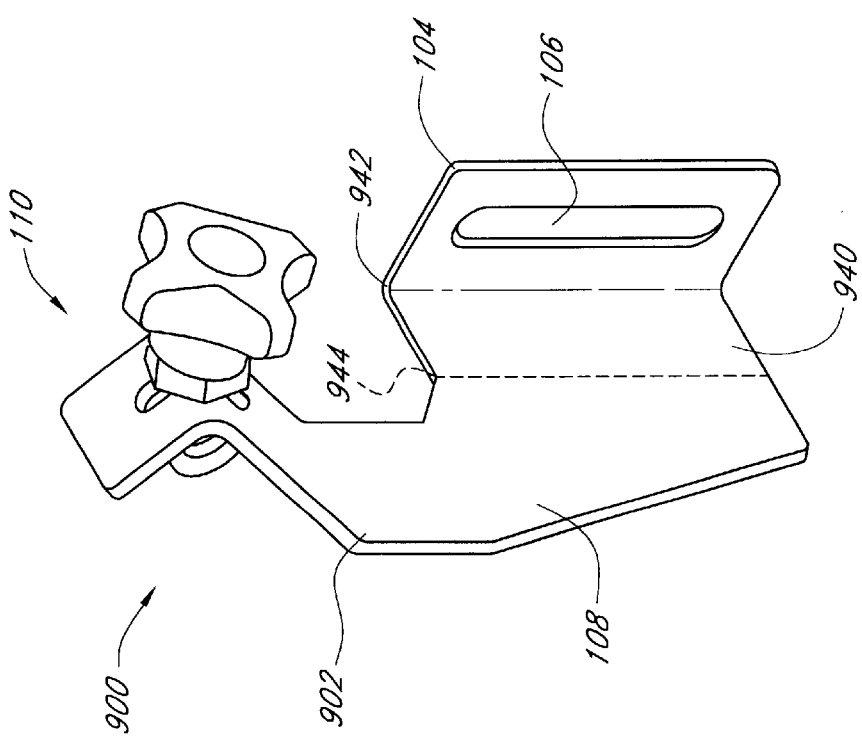
FIG. 9 is a perspective view of an alternative embodiment of a guide rail support bracket assembly including a spacer.

FIG. 9 illustrates an alternative embodiment of a guide rail support bracket assembly 900 adapted to achieve a distal configuration 1050 in which the guide rail support bracket assembly 900 can support the support rods 126 to accommodate larger objects 611 (FIG. 10) in a manner that will be described in greater detail below. The guide rail support bracket assembly 900 comprises a guide rail support bracket 902. The guide rail support bracket 902 includes the mounting segment 104, the mounting hole 106, the support segment 108, and clamping section 110, 510 substantially similar to those previously described in other embodiments.

The guide rail support bracket 902 also includes an extension segment 940. The extension segment 940 is generally rectangular and is preferably formed of the same material as the mounting segment 104 and the support segment 108 as a one-piece member stamped or bent from a flat plate of stainless steel, carbon steel, or any suitable metal or alloy as previously described with respect to the guide rail support bracket 102. The extension segment 940 is attached along a first edge 942 to an edge of the mounting segment 104 so as to extend in a generally perpendicular manner with respect to the mounting segment 104. The extension segment 940 is also attached along a second edge 944 to the support segment 108 such that the extension segment 940 is generally coplanar with the support segment 108. Thus, the extension segment 940 as demarcated by the dashed lines 942, 944 in FIG. 9 is interposed between the mounting segment 104 and the support segment 108 thereby increasing the distance of the support segment 108 along the plane of the support segment 108 from the mounting segment 104 by the width of the extension segment 940.

The dimensions of the guide rail support bracket 902 are substantially similar to the guide rail support bracket 102, except that the dimensions "G" and "H" shown in FIG. 4 are increased for the guide rail support bracket 902 by the width of the extension segment 940. In this embodiment, "G" and "H" are increased by approximately 1 inch which corresponds to more than a 60% increase in the "G" dimension. In addition, the ratio of "G" to "H" is increased to >0.80:1. It is preferred that the "G" to "H" ratio be maintained at least 0.8:1 in order to accommodate the larger objects 611.

Figure 10:
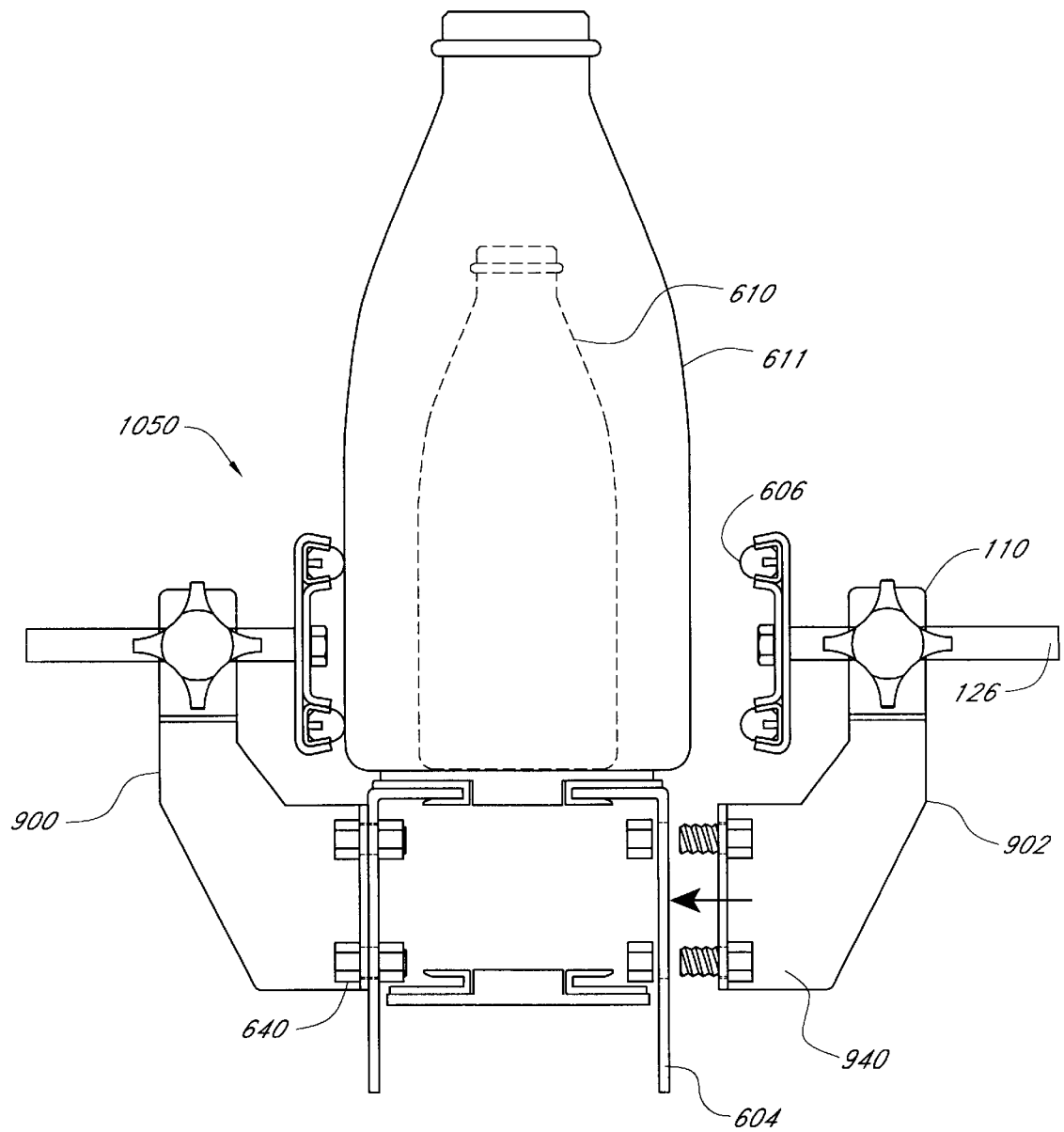
FIG. 10 is an in-line section view of the guide rail support bracket assembly of FIG. 9 as attached to a conveyor body.

FIG. 10 illustrates the attachment of two guide rail support bracket assemblies 900 to define a first distal configuration 1050 of the guide rail support bracket assembly 900. It can be seen in FIG. 10 that the guide rails 606 are maintained in close contact with larger objects 610 without inducing interference between the objects 610 and the guide rail support bracket assemblies 900. In this embodiment, the mounting section 104 of the guide rail support bracket 902 is also attached directly adjacent the conveyor body 604 with the same size of fasteners 640 as with the guide rail support bracket 102 in the proximate configuration 650. It will be appreciated that extension segments 940 of various sizes can be provided to provide a plurality of distal configurations 1050 in alternative embodiments of the invention.

Figure 11:
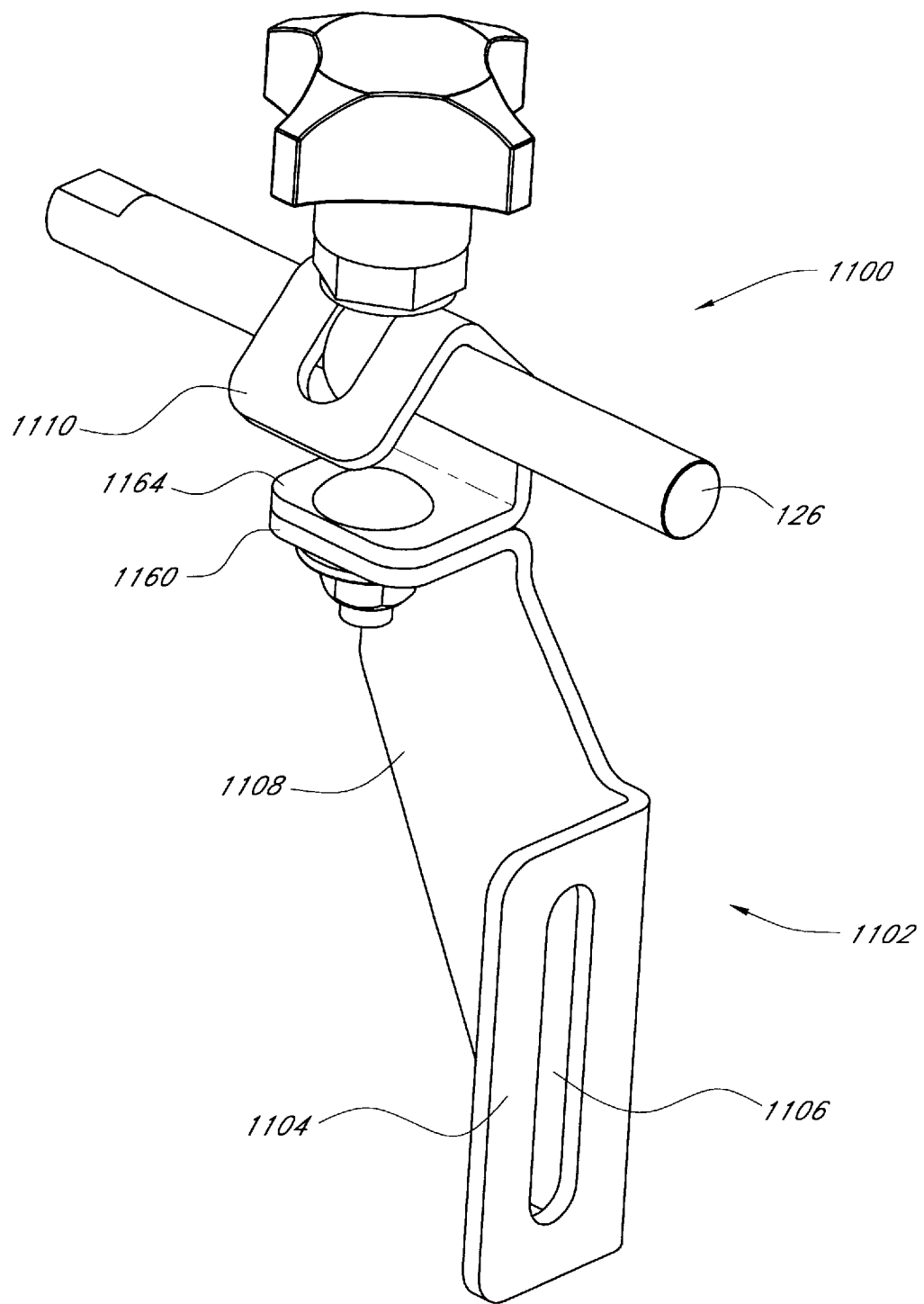
FIG. 11 is a perspective view of one embodiment of a guide rail support bracket assembly including a pivotable support bracket.

FIG. 11 illustrates another embodiment of a guide rail support bracket assembly 1100 including a guide rail support bracket 1102 and a clamping section 1110. Whereas for the embodiments of the guide rail support bracket assemblies 100, 500, 900 previously described which, in their preferred form, are constructed from a one-piece member stamped or bent from a flat plate of stainless steel, carbon steel, or any suitable metal or alloy, the guide rail support bracket 1102 and a clamping section 1110 of this embodiment are formed of two separate one piece stamped members, but are pivotably attached to each other.

Figure 12:
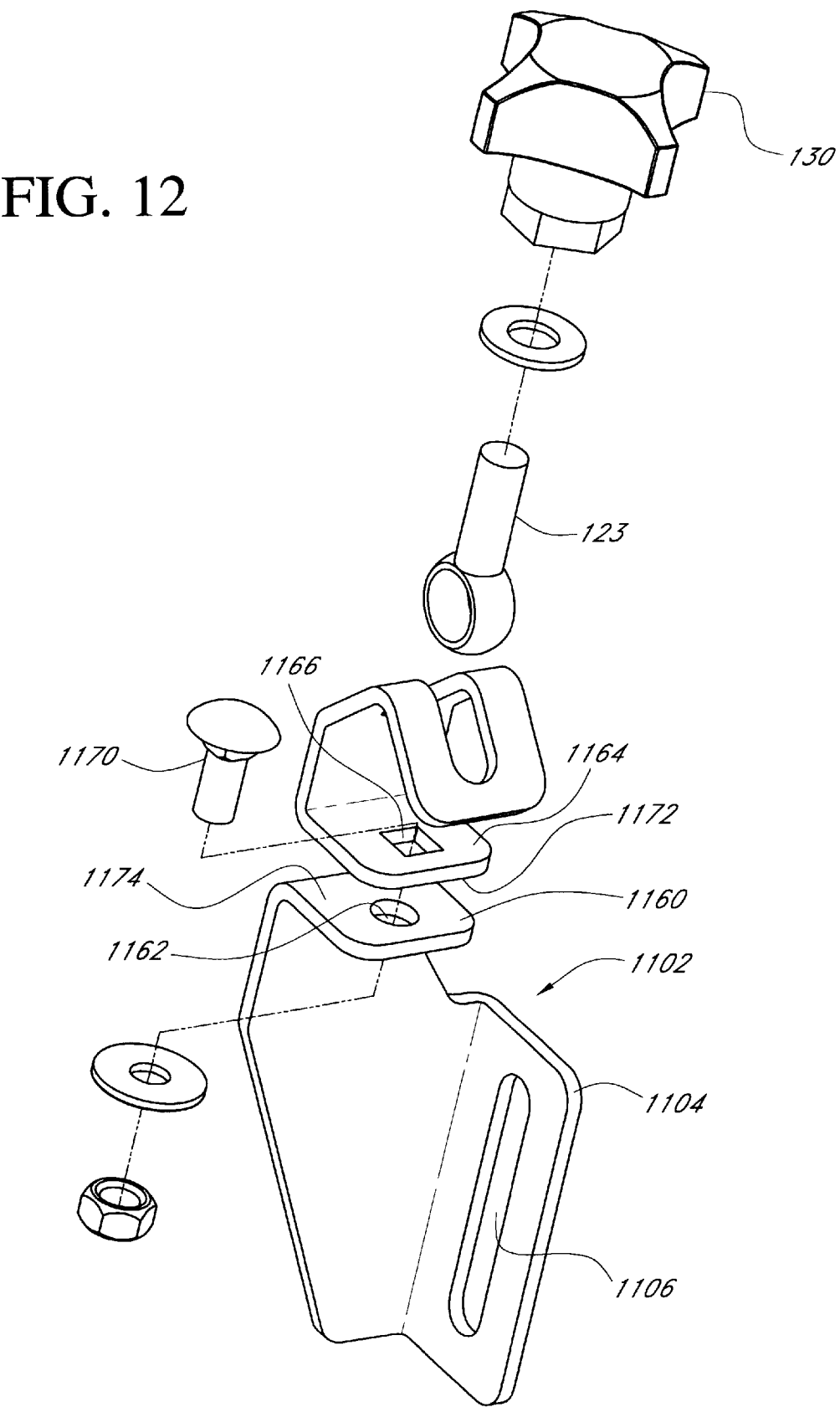
FIG. 12 is an exploded perspective view of the guide rail support bracket assembly including a pivotable support bracket of FIG. 11.
Figure 13:
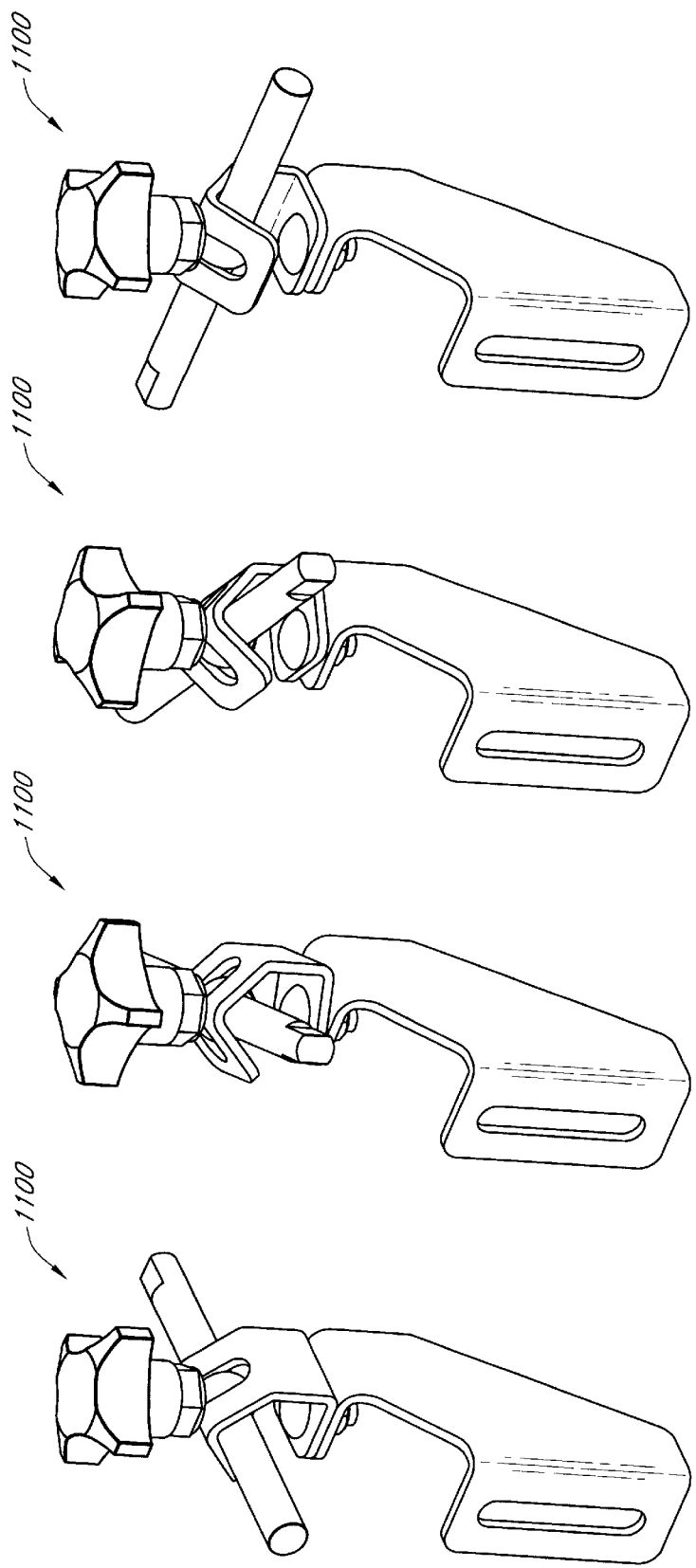
FIGS. 13A–13D are perspective views of the guide rail support bracket assembly including a pivotable support bracket of FIG. 11 in four different pivoted configurations.

In particular, as shown in FIG. 12, the guide rail support bracket 1102 includes a mounting segment 1104 with a mounting hole 1106 positioned therethrough and a support segment 1108 substantially as previously described for the guide rail support bracket assemblies 100, 500, 900. The guide rail support bracket 1102 of this embodiment also includes a support bracket pivot segment 1160. In this embodiment, the support bracket pivot segment 1160 is horizontally arranged so as to be substantially perpendicular to the planes of the mounting segment 1104 and the support segment 1108. The support bracket pivot segment 1160 includes a pivot hole 1162 extending therethrough.

The clamping section 1110 includes a clamping section pivot segment 1164 with a pivot hole 1106 extending therethrough. The support bracket pivot segment 1160 and the clamping section pivot segment 1164 in this embodiment are substantially similar in size and contour. The support bracket pivot segment 1160 and the clamping section pivot segment 1164 are also arranged so as to be parallel and such that the pivot holes 1162, 1166 are concentric. As seen in FIGS. 11 and 12, a support rod 126 is clamped in the bend between the segments 1106 and 1108 by eyebolt 123 and clamping knob 130.

The clamping section 1110 also includes a vertical segment 1104 having its lower end integral with segment 1164. Its upper end is integral with the lower end of an angled segment 1106 that extends inwardly at an angle with about 45°. The upper end of angled segment 1106 is integral with the upper end of an angled segment 1108 that extends downwardly at an angle of about 90° with respect to the segment 1106. A slot 1120 extends into the upper portions of the segments 1106 and 1108.

As seen in FIG. 12, the guide rail support bracket assembly 1100 also includes a fastener 1170. The fastener 1170 of this embodiment includes a carriage bolt with a corresponding flat washer and nut, however, in alternative embodiments, the fastener 1170 can include shoulder bolts, cap screws, lock washers, or other devices for removably securing two or more components. The pivot hole 1166 of this embodiment is of square cross-section and is configured to mate with the square shoulder of the fastener 1170.

As shown in FIG. 12, the carriage bolt of the fastener 1170 is passed through the pivot hole 1166 in the clamping section pivot segment 1164 such that the carriage bolt of the fastener 1170 is held by the pivot hole 1166. The carriage bolt is further inserted through the pivot hole 1162 in the support bracket pivot segment 1160. The washer and nut are then attached to the carriage bolt and tightened so as to draw first 1172 and second 1174 mating surfaces of the clamping section 1110 and guide rail support bracket 1102 respectively into compressive contact. In certain embodiments, at least one of the first 1172 and second 1174 mating surfaces can be provided with knurling or scoring (not shown) to increase the frictional contact between the clamping section 1110 and guide rail support bracket 1102.

As can be seen in FIGS. 13A–13D, the guide rail support bracket assembly 1100 can be secured in a plurality of different 360° rotational arrangements between the guide rail support bracket 1102 and the clamping section 1110. Thus, the guide rail support bracket 1102 can be attached to the conveyor body 604 such that the mounting segment 1104 is parallel to the conveyor body 604. However, by loosening the fastener 1170, reorienting the clamping section 1110, and retightening the fastener 1170, the guide rail support bracket assembly 1100 can be positioned in a configuration to place the support rod 126 in any 360° horizontal angle with respect to the conveyor body 604. Thus, the guide rail support bracket assembly 1100 can readily secure the guide rail 606 in a substantially tangential orientation with respect to the conveyor path even in curves or other areas where the conveyor path is not strictly linear thereby minimizing side loading and smoothing the flow of objects on the conveyor system.

Figure 14:
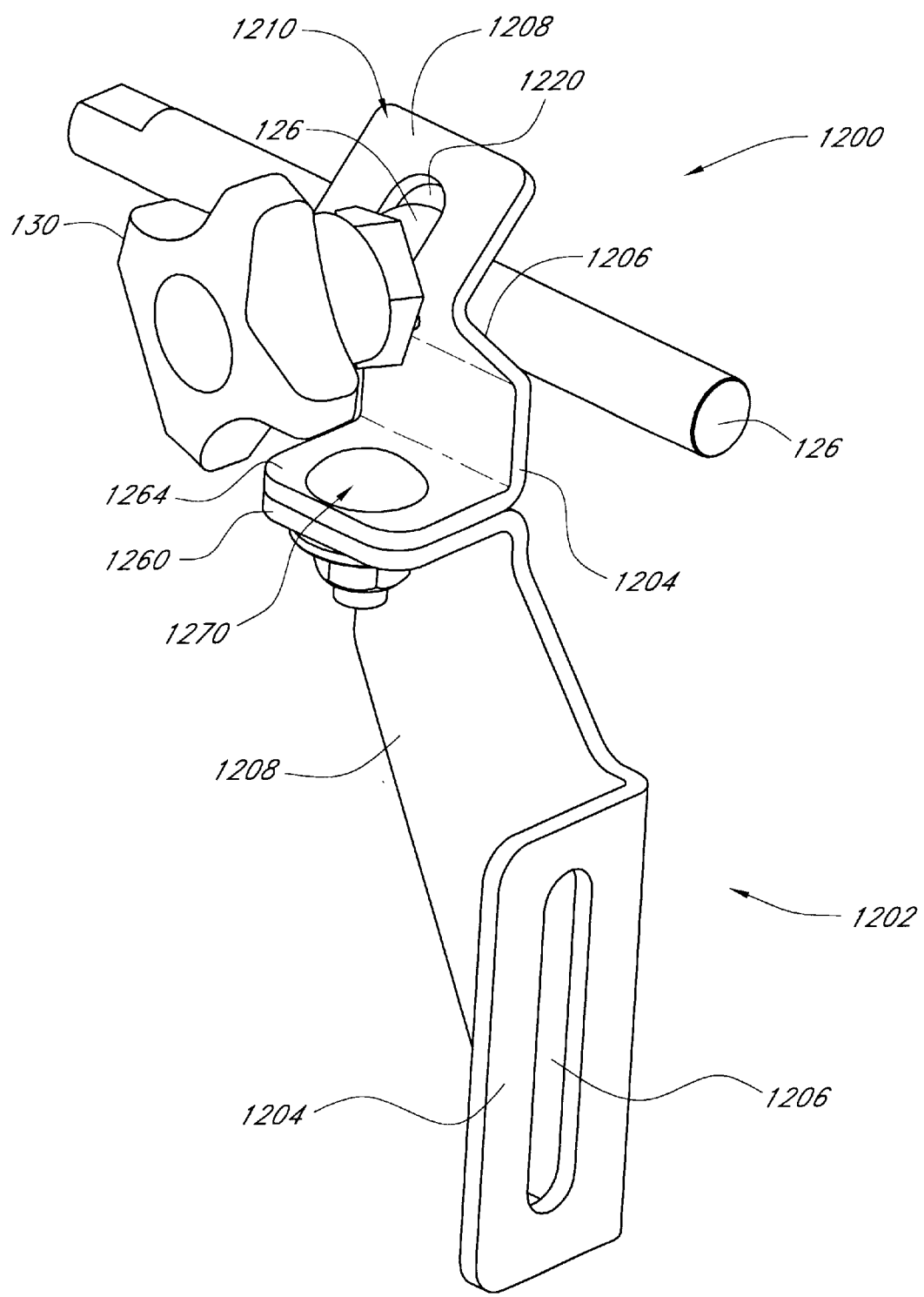
FIG. 14 is a is a perspective view of another guide rail support bracket assembly including a pivotable support bracket.

While the guide rail support bracket assembly 1100 has been described and illustrated with the clamping section 1110 similar to the clamping section 510 of the guide rail support bracket assembly 500 shown in FIG. 5, it will be appreciated that the clamping section 110 of FIGS. 1B and 2A could be used as well, as shown in FIG. 14. The components in FIG. 14 have been numbered in an analogous manner to that of FIG. 11. That is, the assembly 1200 includes a clamping section 1210 having a pivot segment 1264, a vertical segment 1204, an inwardly angling lower segment 1206, and an outwardly angling segment 1208, with a slot 1220 extending through the angled segments. It will also be appreciated that the extension segment 940 of FIG. 9 could be included in alternative embodiments.

While certain exemplary preferred embodiments have been described and shown in the accompanying drawings, it is to be understood that such embodiments are merely illustrative of and not restrictive on the broad invention. Further, it is to be understood that this invention shall not be limited to the specific construction and arrangements shown and described since various modifications or changes may occur to those of ordinary skill in the art without departing from the spirit and scope of the invention as claimed. It is intended that the scope of the invention be limited not by this detailed description but by the claims appended hereto.

What is claimed is:

1. A guide rail support bracket assembly for a conveyor system, the assembly comprising:
    (i) a support bracket comprising:
        (a) a mounting segment extending substantially along a first plane;
        (b) an extension segment attached along a first edge to the mounting segment;
        (c) a support segment connected along an edge to a second edge of the extension segment, the extension and support segments extending substantially along a second plane substantially perpendicular to the first plane; and
        (d) an open clamping section defining an open concave side and an opposite convex side and having a clamping hole formed therein, the clamping section being connected to the support segment at an end spaced from the mounting segment;
    (ii) a threaded eyebolt ending in an eyelet, the eyebolt configured to fit through the clamping hole such that the eyelet is positioned on the concave side of the clamping section; and
    (iii) a fastener configured to thread onto the eyebolt and pull the eyelet into the clamping section from the convex side of the clamping section.

2. The guide rail support bracket assembly of claim 1, wherein the bracket is formed by cutting and bending a generally flat metal plate.

3. The guide rail support bracket assembly of claim 1, wherein the mounting segment, the extension segment, and the support segment together define a unitized support bracket formed by cutting and bending a generally flat metal plate and wherein the clamping section is formed by cutting and bending a separate generally flat metal plate and wherein the support bracket and clamping sections each further comprise a pivot segment and wherein the support bracket and clamping sections are attached to each other so as to provide a possible 360° rotational orientation.

4. The guide rail support bracket assembly of claim 1, wherein the clamping section comprises:
    a first clamping segment attached to the support segment beyond the extension segment, the first clamping segment extending substantially along a third plane, the third plane being substantially perpendicular to the first plane, the first clamping segment being oriented at about a 45 degree angle relative to the support segment; and
    a second clamping segment connected to the first clamping segment at a clamping joint, the second clamping segment extending along a fourth plane, the fourth plane being substantially perpendicular to the first plane, the second clamping segment being oriented between about 70 degrees and 110 degrees relative to the first clamping segment.

5. A conveyor system guide rail support bracket system comprising:
   a conveyor having a conveyor body;
   a first guide rail support bracket formed by cutting and bending a flat metal plate, the first bracket comprising:
      a mounting segment attachable to the conveyor body so as to define a first, proximate configuration;
      a support segment connected at one end to the mounting segment; and
      an open clamping section connected to the support segment at an end spaced from the mounting segment;
   at least a second guide rail support bracket formed by cutting and bending a flat metal plate, the at least second bracket comprising:
      a mounting segment attachable to the conveyor body;
      an extension segment attached along a first edge to the mounting segment so as to define at least a first distal configuration;
      a support segment connected along an edge to a second edge of the extension segment; and
      an open clamping section connected to the support segment at an end spaced from the mounting segment;
   clamping mechanisms wherein the clamping mechanisms comprise:
      a clamping hole formed in the respective clamping section;
      a threaded eyebolt ending in an eyelet, the eyebolt configured to fit through the clamping hole such that the eyelet is positioned on a concave side of the clamping section; and
      a fastener configured to thread onto the eyebolt and pull the eyelet into the concave side of the clamping section from an opposite convex side of the clamping section;
   support rods clamped into the open clamping sections by respective clamping mechanisms; and
   guide rails attached to ends of the support rods.

6. A guide rail support bracket assembly for a conveyor system, the assembly comprising:
   a support bracket comprising:
      a mounting segment;
      a support segment connected to the mounting segment; and
      a bracket pivot segment attached to the support segment;
   an open clamping section having a clamping hole formed therein, the clamping section also defining a clamping section pivot segment wherein the clamping section is connected to the support bracket via the pivot segments such that the support bracket and the clamping section can be secured in any of a 360° relative orientations;
   a threaded eyebolt ending in an eyelet, the eyebolt configured to fit through the clamping hole such that the eyelet is positioned on a concave, open side of the clamping section; and
   a fastener configured to thread onto the eyebolt and pull the eyelet into the concave open side of the clamping section from an opposite convex side of the clamping section.

7. The guide rail support bracket assembly of claim 6 wherein the support bracket further comprises an extension segment attached along a first edge to the mounting segment and along a second edge to the support segment.

8. A guide rail support bracket apparatus for a conveyor system, the apparatus comprising:
   a support bracket including:
      a mounting segment defining a first plane for mounting the bracket on a conveyor system, a support segment connected to the mounting segment defining a second plane substantially perpendicular to the first plane; and
      a bracket pivot segment defining a third plane which is substantially perpendicular to said first plane and to said second plane; and
      an open concave clamping assembly pivotally mounted to said pivot segment and configured to clamp a support rod in a plurality of angular positions both in and with respect to the third plane.

9. The apparatus of claim 1, wherein said clamping assembly includes a pivot segment which extends parallel to, and to pivot with respect to, said bracket pivot segment.

10. The apparatus of claim 8, wherein said clamping assembly includes a fastener to clamp a support rod to the clamping assembly along a plurality of angular orientations with respect to the third plane.

11. The apparatus of claim 8, wherein said clamping assembly includes a pivot segment which is pivotally mounted to said bracket pivot segment.

12. The apparatus of claim 8, wherein said clamping assembly includes a pair of segments which define the open concavity for receiving the support rod.

13. The apparatus of claim 12, wherein said clamping assembly includes a vertical support segment joined to said clamping assembly pivot segment and supporting said segments.

14. A method of guiding objects on a conveyor system, the conveyor system comprising a conveyor body and the conveyor system transporting objects along a non-strictly linear path, the method comprising:
   attaching ones of at least first and second guide rail support brackets to the conveyor body so as to extend at least first or second lateral distances therefrom;
   attaching guide rails to clamping sections via actuation of a securing mechanism positionable along a plurality of angular orientations with respect to a plane of the conveyor body;
   interconnecting the guide rail support brackets and the clamping sections; and
   pivoting the clamping sections along the conveyor body plane such that the guide rails are positioned in a substantially tangential orientation with respect to the conveyor travel.

15. The guide rail support bracket assembly of claim 1, wherein the clamping hole is configured such that the eyebolt may fit through the clamping hole and be secured with the fastener along a range of motion along the clamping section of approximately 90°.

16. The guide rail support bracket assembly of claim 1, wherein the concave open side of the clamping section faces laterally.

* * * * *